US011237600B2

(12) United States Patent
DeMaio

(10) Patent No.: US 11,237,600 B2
(45) Date of Patent: *Feb. 1, 2022

(54) HINGE MECHANISM FOR ELECTRONIC DEVICES

(71) Applicant: Robert Charles DeMaio, Sparks, NV (US)

(72) Inventor: Robert Charles DeMaio, Sparks, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/092,621

(22) Filed: Nov. 9, 2020

(65) Prior Publication Data

US 2021/0081008 A1   Mar. 18, 2021

Related U.S. Application Data

(63) Continuation of application No. 16/577,594, filed on Sep. 20, 2019, now Pat. No. 10,831,244, which is a continuation-in-part of application No. 29/706,209, filed on Sep. 18, 2019, now Pat. No. Des. 918,898.

(51) Int. Cl.
*G06F 1/16* (2006.01)
*E05D 3/06* (2006.01)

(52) U.S. Cl.
CPC ............. *G06F 1/1681* (2013.01); *E05D 3/06* (2013.01); *G06F 1/1624* (2013.01); *G06F 1/1626* (2013.01); *E05Y 2900/606* (2013.01)

(58) Field of Classification Search
CPC .... G06F 1/1654; G06F 1/1641; G06F 1/1675; G06F 1/1681; G06F 1/1692
See application file for complete search history.

(56) References Cited

U.S. PATENT DOCUMENTS

| 10,831,244 | B1* | 11/2020 | DeMaio | G06F 1/1656 |
| 2007/0182663 | A1 | 8/2007 | Biech | |
| 2012/0139815 | A1* | 6/2012 | Aono | G06F 1/1677 345/1.3 |
| 2017/0257146 | A1* | 9/2017 | Szeto | H02J 50/10 |
| 2019/0004764 | A1* | 1/2019 | Son | G06F 1/1654 |
| 2021/0157357 | A1* | 5/2021 | Wang | G06F 1/1641 |

OTHER PUBLICATIONS

International Search Report dated Oct. 15, 2020 issued in connection with International Application No. PCT/US2020/051364 with (3 pages total).
Written Opinion of the International Searching Authority dated Oct. 15, 2020 issued in connection with International Application No. PCT/US2020/051364 with (4 pages total).

* cited by examiner

*Primary Examiner* — Anthony Q Edwards
(74) *Attorney, Agent, or Firm* — Tatonetti IP

(57) ABSTRACT

A hinge mechanism for electronic devices is implemented by which a user can mechanically and communicatively connect two devices together. Each device supports a rotatable cylindrical shaft that is positioned near adjacent edges of each respective smartphone. The rotatable shaft includes spring-loaded tabs which lock into place against corresponding notches on a hinge pin that is positioned within a cavity of the rotatable shaft. User manipulation (e.g., rotation) of the devices translates to the rotatable shaft to thereby cause rotation of a device relative to the partner device. Upon authorized connection, various functionality can be enabled between the two devices, such as sharing displays to create one large display for viewing and sharing battery power between the devices.

20 Claims, 19 Drawing Sheets

Hinge pin

Rotatable shaft

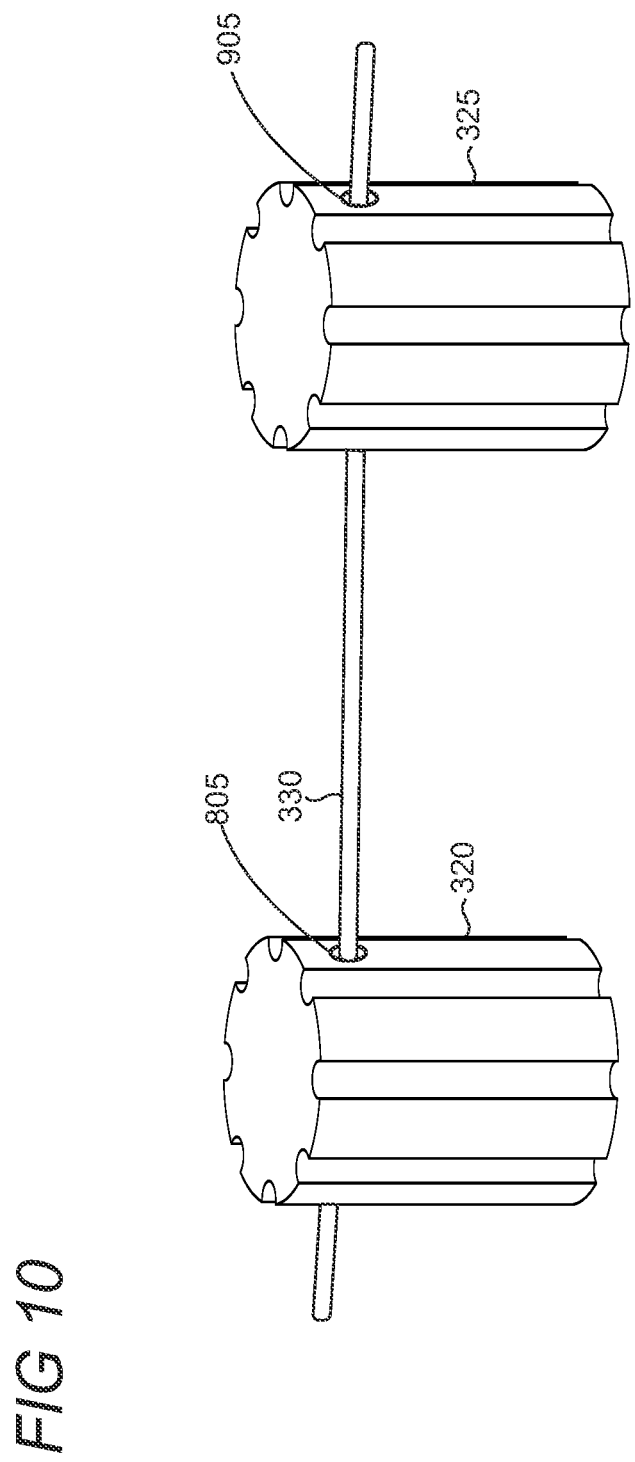

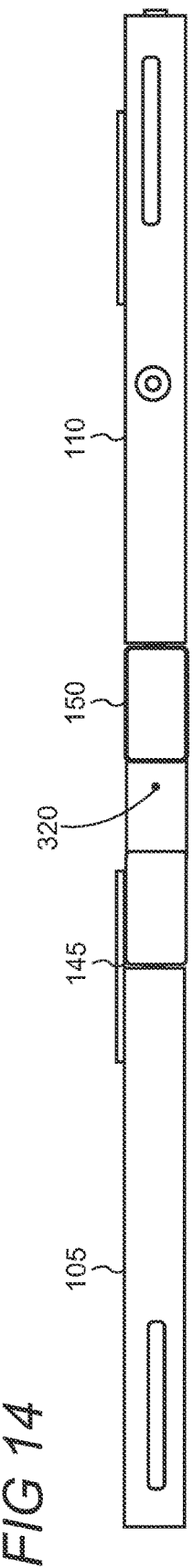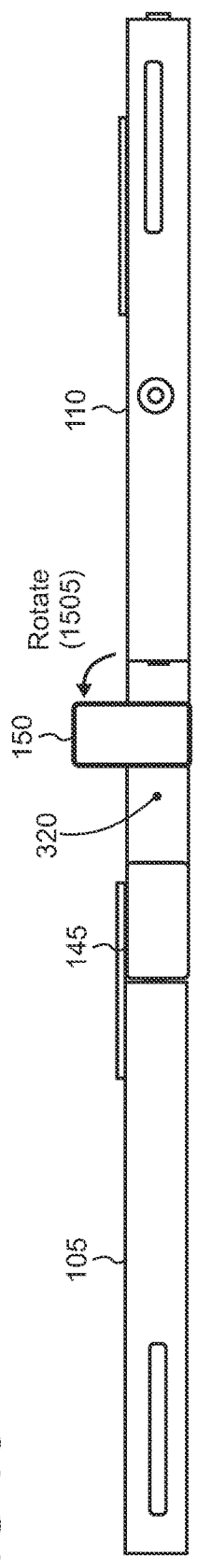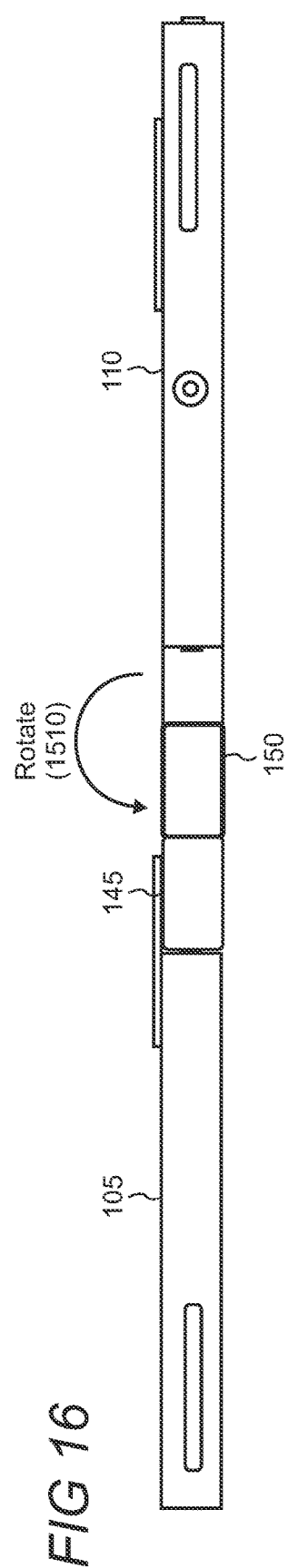

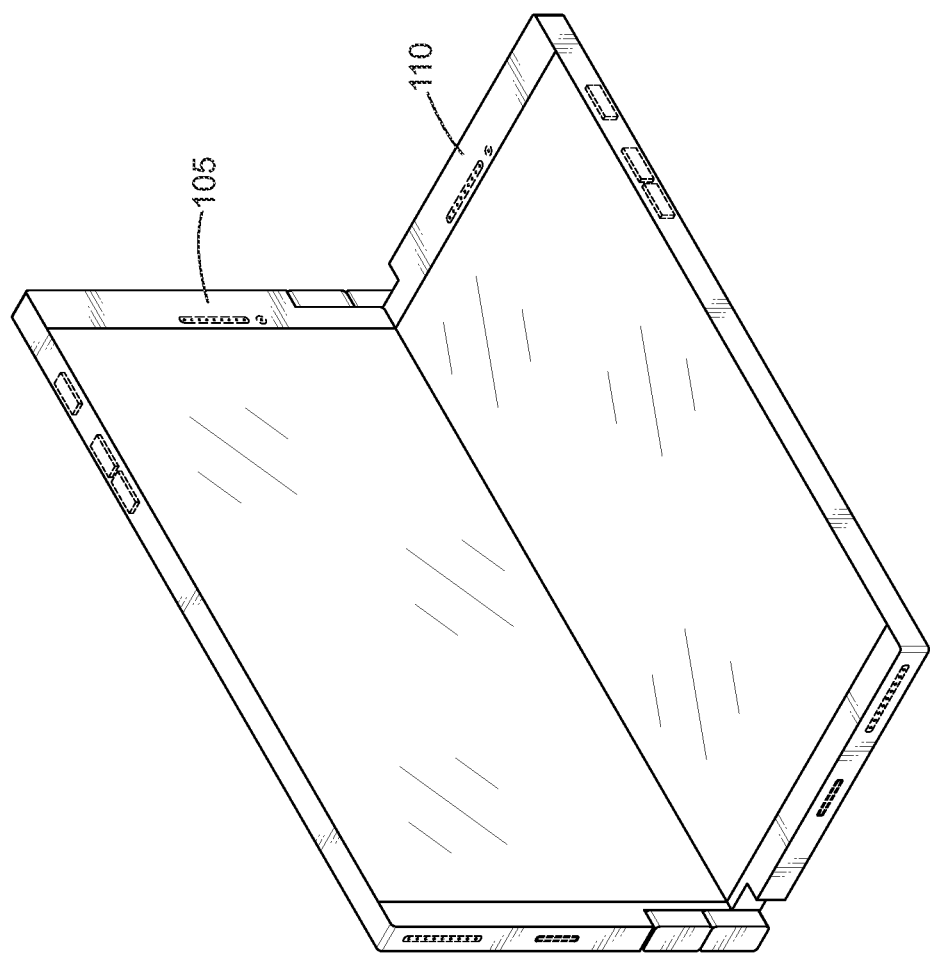

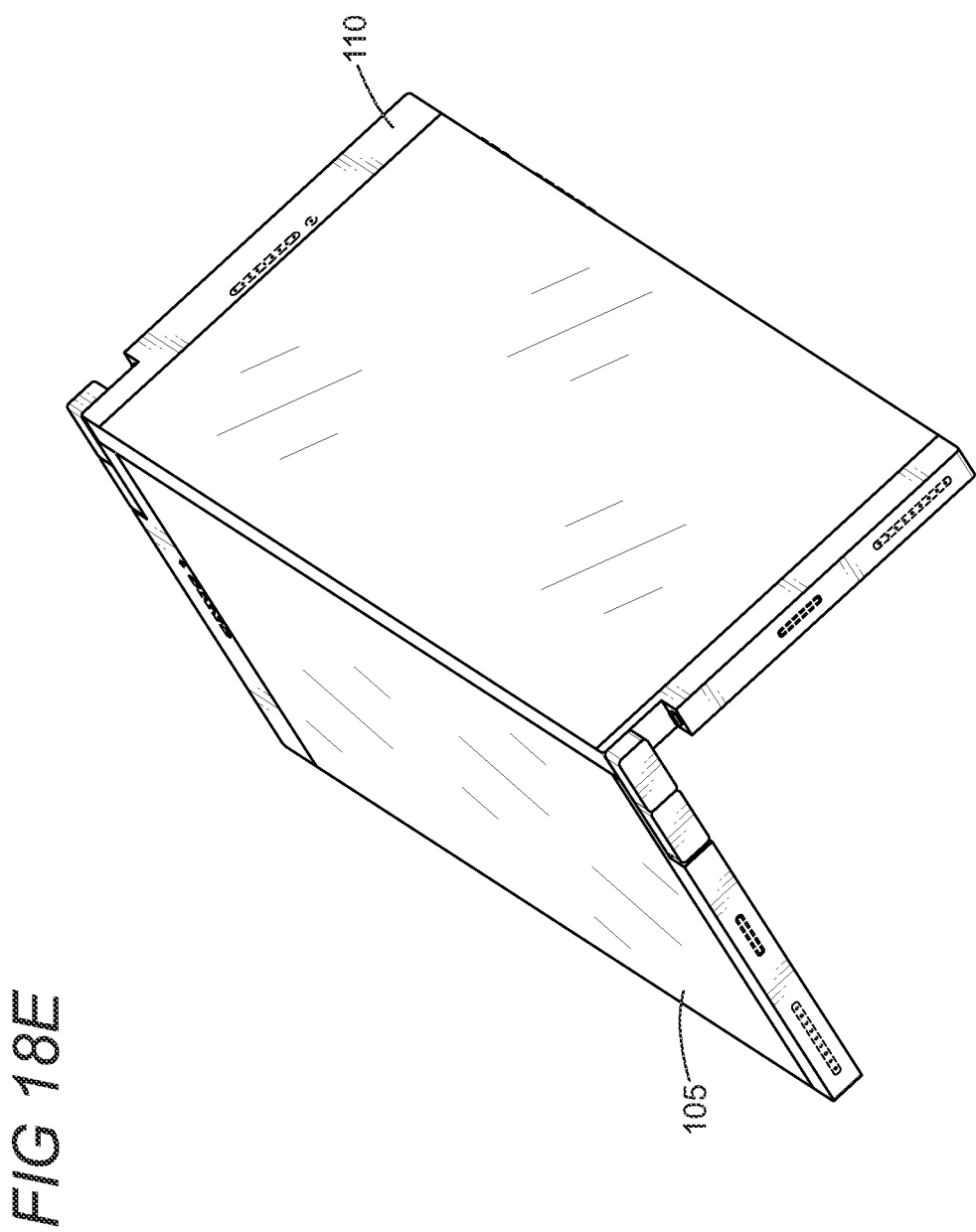

HINGE MECHANISM FOR ELECTRONIC DEVICES

CROSS-REFERENCE TO RELATED APPLICATIONS

This Non-Provisional Utility Patent Application claims the benefit of and priority to U.S. Non-Provisional Utility patent application Ser. No. 16/577,594, filed Sep. 20, 2019, entitled "Hinge Mechanism for Electronic Devices," the entire contents of which is hereby incorporated herein by reference. This Non-Provisional Utility Patent Application is a Continuation-In-Part application and claims the benefit of and priority to U.S. Non-Provisional Design patent application Ser. No. 29/706,209, filed Sep. 18, 2019, entitled "One or More Electronic Devices," the entire contents of which is hereby incorporated herein by reference.

BACKGROUND

Smartphone computers are typically utilized individually by a user or, in some scenarios, can be supplemented by an additional computing device using a wired or wireless (e.g., Bluetooth®) connection. Typically, the smartphone may be connected to a user's personal computer (PC) or laptop using a universal serial bus (USB) or other connector to transfer media files like photos or music. Users with multiple smartphones may find it tedious to effectively leverage the operations and functionality of both phones simultaneously, if at all.

SUMMARY

A hinge mechanism for electronic devices is implemented by which a user can mechanically and communicatively connect two devices together. Authorized connection of the two devices can enable each device to leverage the partner device's functionality, battery power, applications, screen real estate, etc. While the disclosure herein references a primary smartphone and a companion smartphone as the two electronic devices, other types of electronic devices for the present implementation are also possible, such as tablets and laptop computers.

Each smartphone supports a rotatable cylindrical shaft that is positioned near an edge of the respective phone. The rotatable shaft may be positioned on a left side portion of a primary smartphone and a right side portion of a companion smartphone. Respective hinge pins are positioned inside cavities of the rotatable shafts and extend outside from an inside of the primary and companion smartphones. The hinge pin on the companion smartphone is protected via a sliding element that locks into place above the hinge pin. Likewise, the hinge pin on the primary smartphone is protected via a separate sliding element that locks into place above its hinge pin. The sliding elements fill a cut-out on the respective smartphones which are constructed for the hinge mechanism. In typical implementations, both sliding elements are congruent in size and shape.

When opposing edges of the primary smartphone and the companion smartphone are touching, each sliding element moves left, that is, the companion smartphone's sliding element moves to an end of its cut-out and the primary smartphone's sliding element overlaps with the cut-out on the primary and companion smartphones. The companion smartphone's cut-out on which the sliding element is positioned is 1½ times the size of the individual sliding elements to accommodate an entire body of the companion smartphone's sliding element and half the body of the primary smartphone's sliding element. In typical implementations, the cut-out on the primary smartphone is substantially a one-to-one ratio to the size of the sliding element. Positioned underneath and attached to the primary smartphone's sliding element is a locking pin that dually connects to the primary and companion smartphone's respective hinge pins. Each sliding element comes equipped with a locking mechanism (e.g., a structural configuration that functions as a cotter pin or split pin) that engages and disengages with one or more of the hinge pins responsive to manual pressure and which secures the components together.

Each rotatable shaft is configured with spring-loaded tabs that secure against corresponding spaced notches on the hinge pins. In typical implementations, each rotatable shaft and hinge pin have eight spring-loaded tabs and notches, respectively, which are evenly distributed about 360°. The rotatable shaft rotates about the hinge pin which is fixed in place via the locking pin that dually and simultaneously engages the respective smartphone's hinge pins. Rotation of a rotatable shaft corresponds to movement of the respective smartphone relative to the partner smartphone. The spring-loaded tabs disengage from the hinge pin's notches responsive to receiving pressure from the device user (e.g., by manipulating one or both smartphones) and then re-engage when the tabs and notches align again. Each rotatable shaft can operate individually or in combination with the other rotatable shaft. For example, to find an ideal position, a user can manipulate only the primary smartphone relative to the companion phone or vice versa, or can manipulate both smartphone's simultaneously relative to each other.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

FIG. 10 shows an illustrative diagram in which the locking pin is inserted through respective holes on the hinge pins for the primary and companion smartphones;

FIGS. 14-16 show illustrative diagrams showing consecutive rotational movements of the sliding element according to another embodiment;

FIGS. 18A-F show various angles at which the smartphones can bend using the hinge mechanism;

Like reference numerals indicate like elements in the drawings. Elements are not drawn to scale unless otherwise indicated.

DETAILED DESCRIPTION

Figure 1:
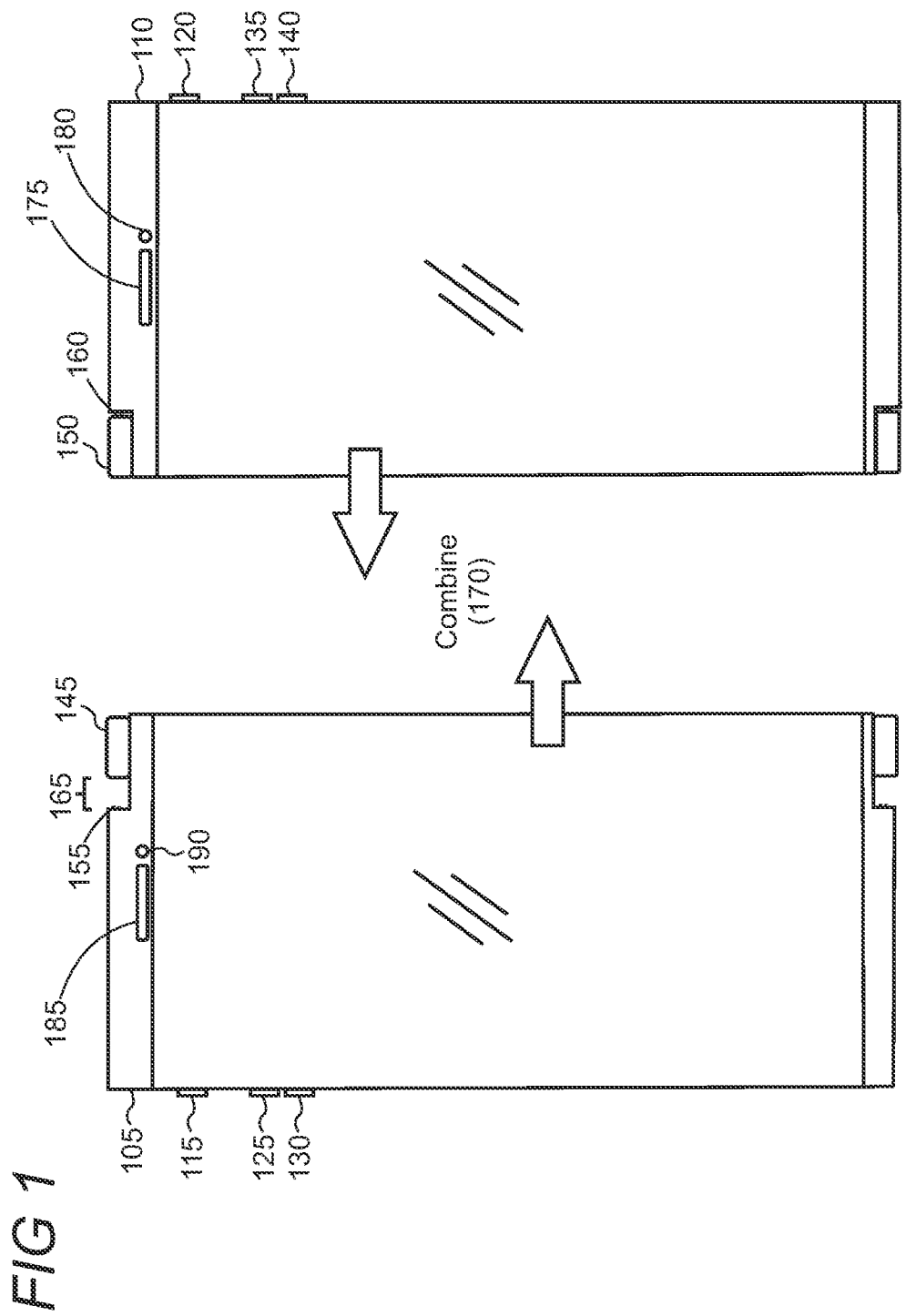
FIG. 1 shows an illustrative environment in which a primary smartphone and companion smartphone are positioned adjacent to each other.

FIG. 1 shows an illustrative environment in which a primary smartphone 110 and companion smartphone 105 are positioned adjacent to each other. A user may wish to combine 170 the smartphones to, for example, form a single display screen or charge the other phone's battery. The disclosure herein references the hinge mechanisms positioned on a top of the respective smartphones as a reference, but the bottom of each smartphone has symmetrical components which operate like the top. Thus, any discussion pertaining to the top of the hinge mechanisms herein additionally apply to the hinge mechanisms positioned on the bottom of the respective smartphones.

Each smartphone device can be configured with components to operate as computing devices, including one or more processors, memory, input/output buttons, network interface controllers (NICs), and the like. For example, each smartphone has a power button 115, 120, an increase volume button 125, 135, and a decrease volume button 130, 140. The smartphones additionally have speakers 185, 175 to, for example, listen to phone calls and a front-facing camera 180, 190 for capturing images or video.

Figure 2:
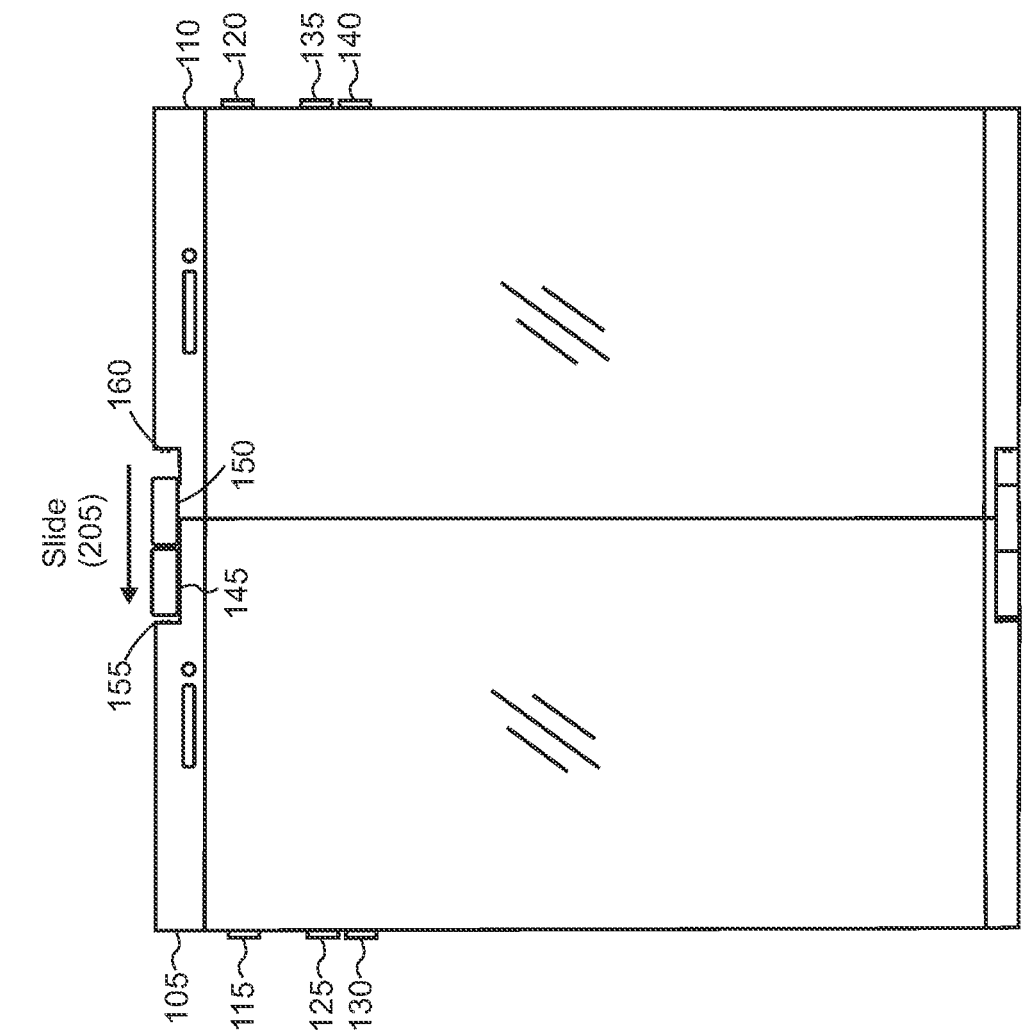
FIG. 2 shows an illustrative environment in which the primary and companion smartphones are locked together via sliding elements.

When a user wishes to combine 170 both smartphones, the user may position each smartphone adjacent to each other such that the edges are touching (FIG. 2). Each smartphone has respective sliding elements 145 and 150. The sliding element 145 on the companion smartphone 105 is principally implemented to protect a hinge pin (not shown in FIG. 1) positioned underneath it and which extends from a top and bottom of the smartphone's casing. The sliding element 150 on the primary smartphone 110 likewise protects a hinge pin positioned underneath it and which extends from the smartphone's casing. The primary smartphone's sliding element 150 is secured in place to the connecting mechanism 160 positioned to the right of the sliding element on a wall of the cut-out in which the sliding element is positioned. The connecting mechanism may be, for example, male/female mating members to which the sliding element engages and disengages with the opposing mating member. The companion smartphone's cut-out that supports the sliding element 145 is approximately 1½ times larger than the cut-out on the primary smartphone, as representatively shown by numeral 165. The cut-out is larger on the companion smartphone to accommodate a the entire sliding element 145 and at least approximately half of the sliding element 150, as shown in FIG. 2.

FIG. 2 shows an illustrative environment in which the companion smartphone 105 and the primary smartphone 110 are positioned adjacent to each other and opposing edges are touching. The sliding elements 145 and 150 have slid to the left, as representatively shown by numeral 205, such that the sliding elements 145 and 150 are touching or near-touching responsive to manual manipulation by a user. The respective cut-outs and sliding elements may have corresponding or complementary grooves or tracks to enable the sliding movement. Sliding the sliding elements over causes the sliding element 150 to simultaneously overlap with the primary and companion smartphones. The sliding element 150 engages with the hinge pin which was previously protected by the companion smartphone's sliding element 145. A locking pin affixed to the sliding element 150 correspondingly moves with the sliding element and dually engages with hinge pins extending from the primary and companion smartphones (not shown in FIG. 2).

Figure 3:
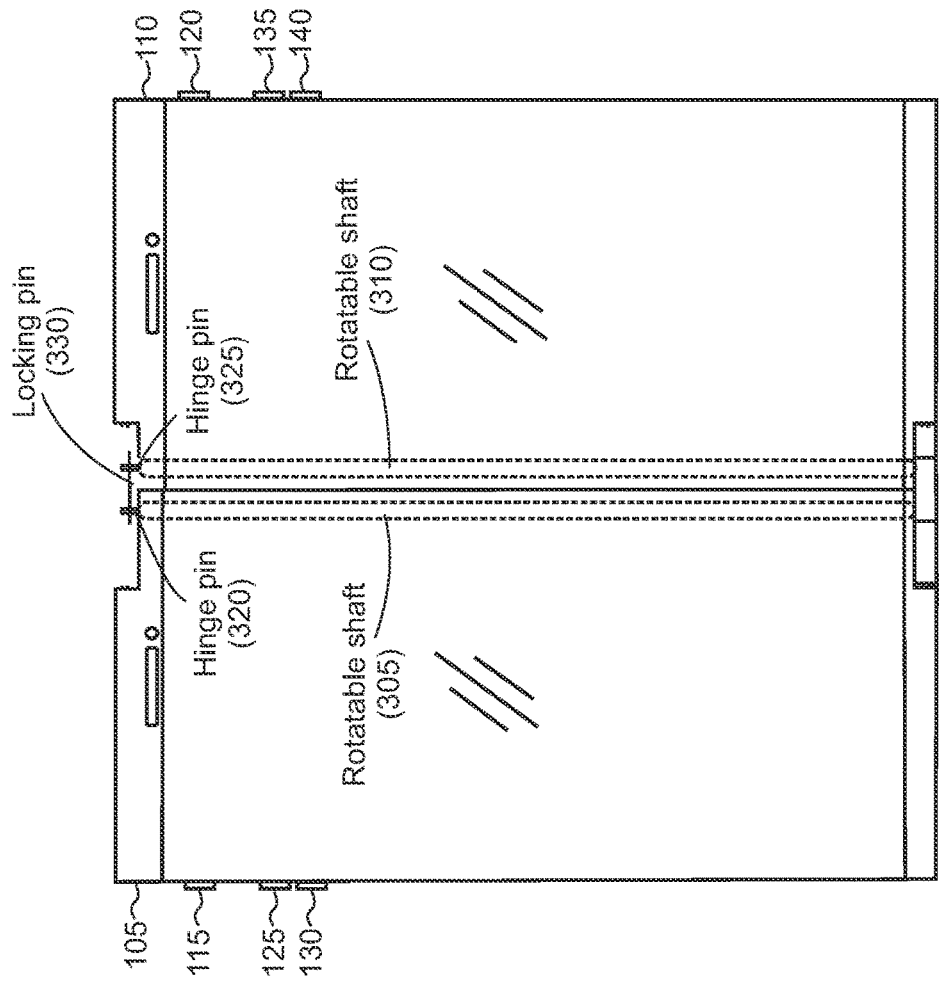
FIG. 3 shows an illustrative environment in which cylinders, hinge pins, and a locking pin operate together to form a hinge system between the two smartphones.
Figure 4:
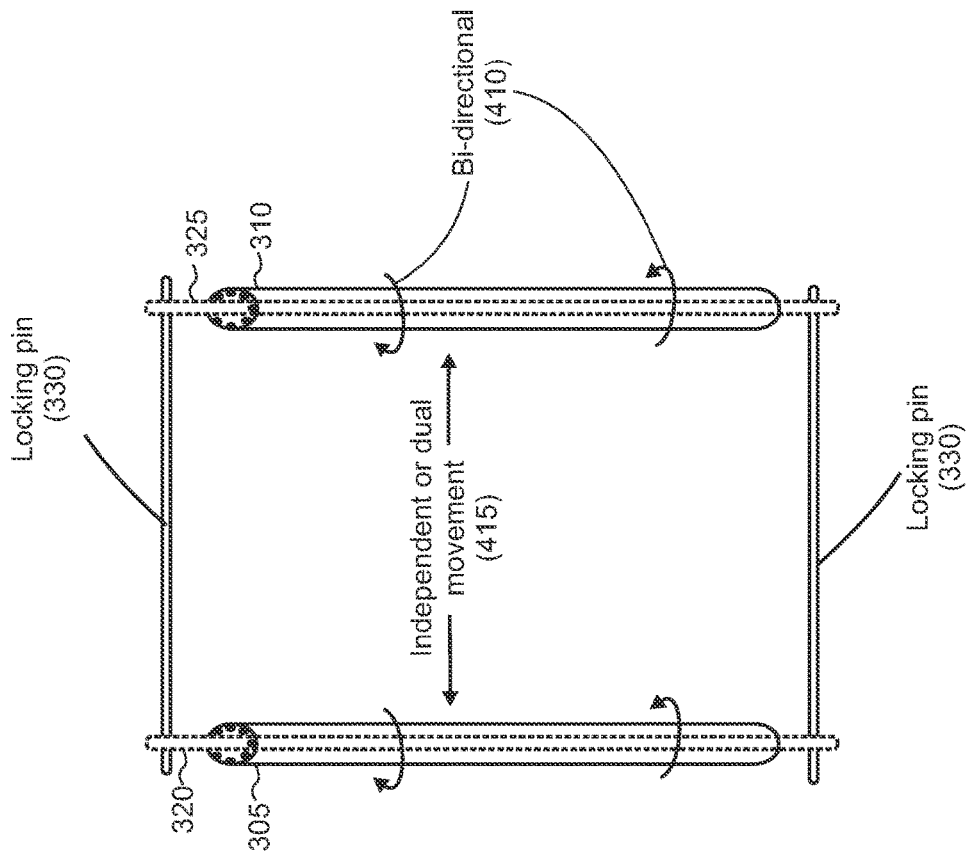
FIG. 4 shows an illustrative diagram of the hinge system without the respective smartphones.

FIG. 3 shows an illustrative environment in which components of the hinge mechanism are exposed, and FIG. 4 shows an overview of the hinge system 405 without the computing devices of FIGS. 1-3. Sliding elements 145 and 150, in FIG. 3, have been lifted to expose the components of the hinge mechanism, as representatively shown by numeral 315. Unless otherwise indicated, the drawings are not drawn to scale and are represented for clarity in exposition.

A cylindrical rotatable shaft 310 extends vertically through a left side of the primary smartphone 110 and a cylindrical rotatable shaft 305 extends vertically through a right side of the companion smartphone 105. Hinge pins 320 and 325 are respectively positioned inside a cavity of the rotatable shafts 305, 310, and extend out a top and bottom of the respective smartphone's housing. The locking pin 330 extends perpendicularly through holes (not shown in FIGS. 3 and 4) on each hinge pin to thereby lock and prevent movement of the hinge pins. Each component (e.g., the rotatable shafts, hinge pins, locking pins) of the hinge system may be comprised of titanium to create a reliable and resistant system, although other types of metals suitable for the purposes discussed herein are also possible.

Each sliding element 145, 150 comes equipped with a locking mechanism (not shown in FIGS. 3 and 4) attached thereto which structurally and functionally operates as a cotter or split pin, and which engages with the hinge pins. The locking mechanism may be an additional component attached to the sliding element or may be formed of the same piece of material. Manual pressure on a sliding element causes the locking mechanism to engage with the hinge pins 320, 325. The locking mechanism on the primary smartphone's sliding element prevents the sliding element from disengaging with the hinge pin. Since the locking pin dually engages with and prevents rotational movement of each hinge pin, the locking mechanism prevents the sliding element 150 from moving and thereby the locking pin from disengaging with the hinge pins, such as when the user is rotating the smartphones and the rotatable shaft. Typically, the locking mechanism simultaneously locks and unlocks in place with each hinge pin responsive to user manipulation.

The rotatable shafts are attached to the respective smartphones such that movement of the rotatable shaft translates to movement of the smartphone, and vice versa. The rotatable shafts may be integrated with the smartphone by being mounted to and/or welded to its internal casing. The rotatable shafts are bi-directional 410 (i.e., they move clockwise and counterclockwise). Movement of each rotatable shaft is independent of the other and can also dually operate in tandem to provide user's with greater freedom in selecting the hinge's position, as representatively shown by numeral 415. For example, the companion smartphone's rotatable shaft can move relative to the future smartphone, the future smartphone's rotatable shaft can move relative to the companion smartphone, or both can move together to increase the number of available positions to the user.

Figure 6:
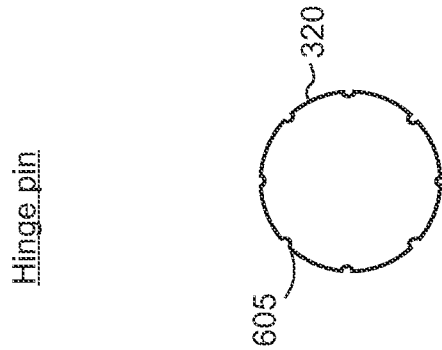
FIG. 6 shows an illustrative diagram of the hinge pin with spaced apart notches.
Figure 5:
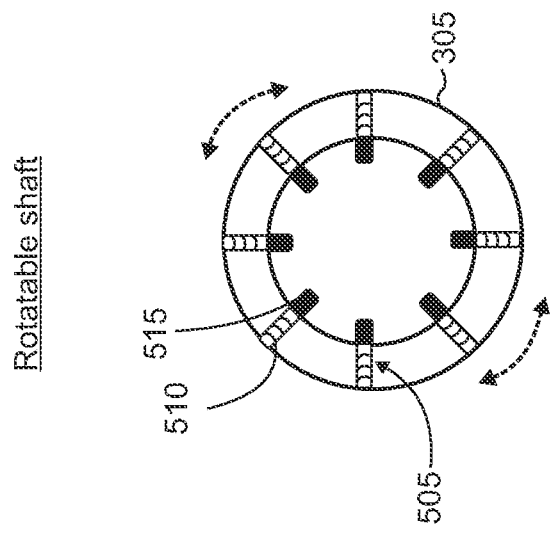
FIG. 5 shows an illustrative diagram of the cylinder with spring-loaded tabs.

FIGS. 5 and 6 show illustrative structural diagrams of the rotatable shaft 305 and hinge pin 320, respectively. The rotatable shaft includes spring-loaded tabs 505, each of which includes springs 510 and tabs 515 which move forward and backward based on the amount of pressure exerted against the springs. The hinge pin includes spaced-apart notches (or grooves) 605 around its perimeter which correspond to the positioning of the spring-loaded tabs. The spring-loaded tabs snap into place when aligned with the notches of the hinge pin.

Figure 8:
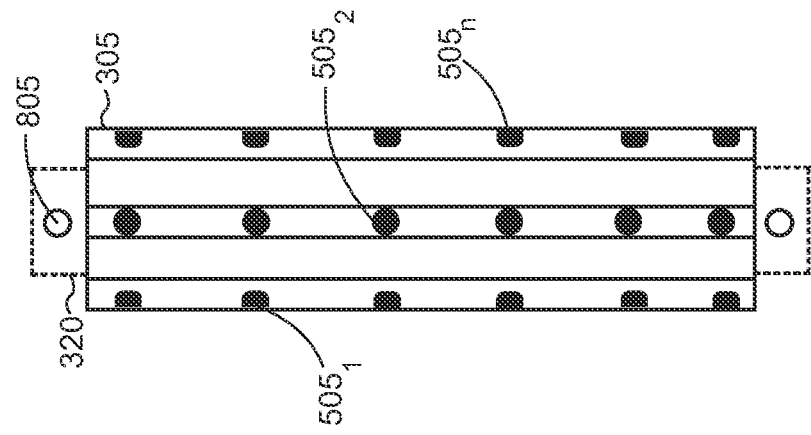
FIG. 8 shows an illustrative cut-out view of the hinge system.
Figure 7:
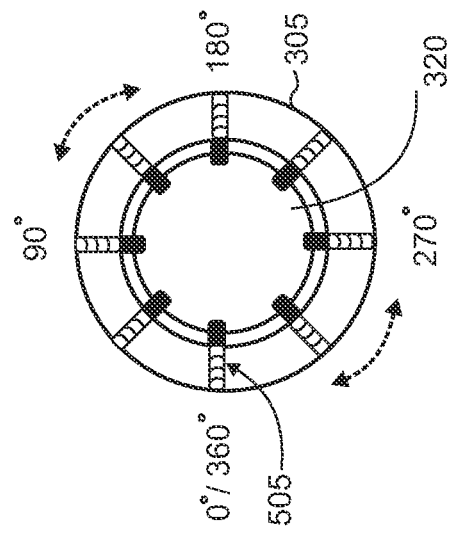
FIG. 7 shows an illustrative diagram of the assembled cylinder and hinge pin.

FIG. 7 shows an illustrative diagram in which the hinge pin 320 is assembled and inserted into a cavity of the rotatable shaft 305, and FIG. 8 shows an illustrative cut-out diagram of the assembled hinge system. The hole 805 on the primary smartphone's hinge pin receives the locking pin 330 and dually locks the primary and companion smartphones' respective hinge pins in place (FIG. 3). A compression system is employed to tightly compress the hinge pin and rotatable shaft to each other. This compression methodology can reliably secure these components in place and prevent any of the components from loosening. The spring-loaded tabs 505 enable a user to manipulate (e.g., rotate) the companion smartphone 105 in which the pressure exerted on the smartphone 105 translates to the springs 510 on the spring-loaded tabs 505. The pressure causes the springs to compress and thereby the tabs disengage from the notches 605 on the hinge pin 320. As the rotatable shaft continues to rotate responsive to the user's manipulation of the smartphone, the spring-loaded tabs lock into place when the tabs and notches align again (e.g., every 45° in this example).

In typical implementations, the spring-loaded tabs 505 are evenly spaced about 360°. While FIGS. 5-7 show eight spring-loaded tabs and notches spaced every 45°, other implementations can have less or more spring-loaded tabs and notches that may or may not be evenly spaced. For example, the spring-loaded tabs may be positioned at particular locations to enable the smartphone to snap into particular hinged positions (e.g., 45° and 315° angles only). While reference numerals and discussions for FIGS. 5-8 are tailored to components on the companion smartphone, such discussion likewise applies to the primary smartphone.

Figure 9:
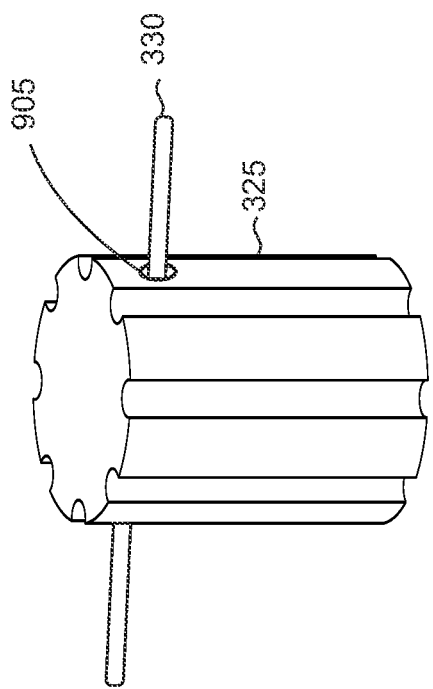
FIG. 9 shows an illustrative diagram of the locking pin extending through a hole on the hinge pin.

FIGS. 9 and 10 show illustrative diagrams of the hinge pin 325 and locking pin 330. The primary smartphone's hinge pin 325 includes a hole 905 to receive the locking pin 330. The hinge pin 320 on the companion smartphone 105 likewise has a hole 805 through which the locking pin extends.

FIG. 10 depicts a scenario in which the primary and companion smartphones are adjacent to one another and ready for connecting. The user can slide the sliding element 150 over to the companion smartphone (FIG. 2), responsive to which the locking pin locks into the companion smartphone's hinge pin 320. The locking pin dually locks into each smartphone's hinge pin 320 and 325. The locking pin may maintain connection to the primary smartphone's hinge pin 325 since the sliding element to which it attaches will typically revert back to the cut-out on the primary smartphone. Thus, the locking pin may engage and disengage from the hinge pin 320 on the companion smartphone 105 but, in typical implementations, maintains a connection to the primary smartphone's hinge pin 325.

Figure 11B:
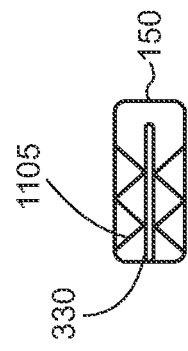
FIGS. 11A-D show illustrative diagrams in which a locking mechanism is employed on the sliding element to secure the sliding element to one or more of the hinge pins protruding from an end of the respective smartphones.
Figure 11A:
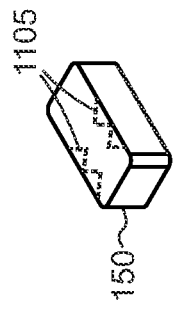
Figure 11D:
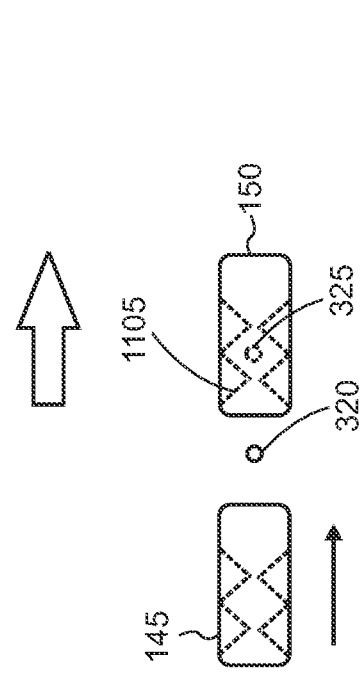
Figure 11C:
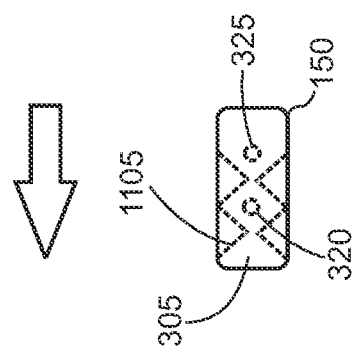

FIGS. 11A-D show illustrative diagrams of the primary smartphone's sliding element 150 from various angles to show the various components and their configuration within the hinge system. FIGS. 11A, 11C, and 11D represent a top view of the sliding element and FIG. 11B represents an underside view of the sliding element and its components. Dashed lines represent that which is beneath the sliding element.

The sliding element includes a locking mechanism 1105 which locks into the primary smartphone's hinge pin 325 and the companion smartphone's hinge pin 320 with sufficient manual exertion from a user. The locking mechanisms in this example structurally functions as a cotter pin or a split pin such that the hinge pins can be locked or unlocked from the sliding element with sufficient force to overcome a respective groove. For example, FIG. 11C shows an example in which the primary smartphone's sliding element 150 has been slid over to overlap with the companion smartphone (FIG. 2). Here, the sliding element's locking pin engages with the hole in each hinge pin, and thereby prevents movement relative to the rotating shaft (not shown), and its locking mechanism secures the sliding element to each hinge pin. In FIG. 11D, the sliding element 150 has been slid back over to the primary smartphone's cut-out. The locking mechanism on the sliding element and the locking pin disengage from the companion smartphone's hinge pin 320, and the primary smartphone's hinge pin is then placed within a new groove within the locking mechanism, as shown in FIG. 11D. The companion smartphone's sliding element 145 can move back over to its hinge pin 320 and lock into place using its own locking mechanism to protect the hinge pin from exposure and damage.

The combination of the locking mechanism 1105 and locking pin 330 enable the locking pin to dually and simultaneously connect each smartphone's hinge pin and connect the smartphones together. The locking mechanism is implemented so the connection does not come undone without sufficient user pressure (e.g., by manually sliding the sliding element back over to the primary smartphone 110).

Figure 13:
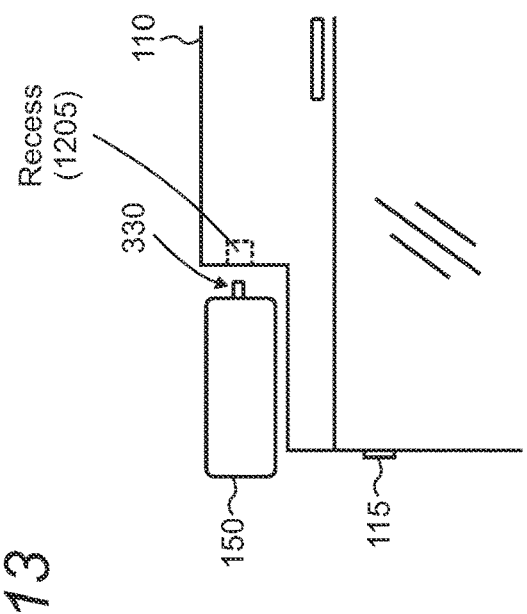
FIG. 13 shows an illustrative diagram of the locking pin extending beyond an end of the primary smartphone's sliding element.
Figure 12:
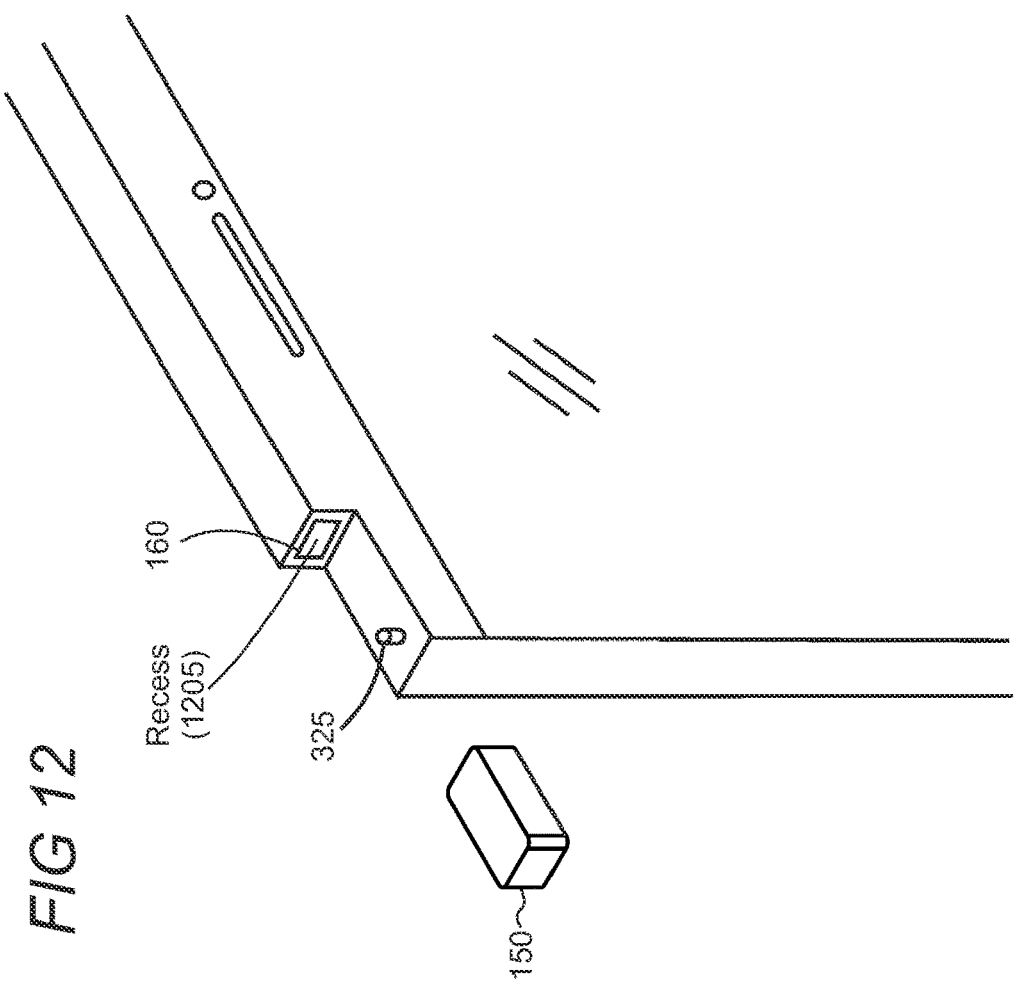
FIG. 12 shows an illustrative diagram of a recess on the connector mechanism for the primary smartphone.

FIGS. 12 and 13 show illustrative diagrams in which the connecting mechanism 160 on the primary smartphone 110 has a recess 1205 to accept a portion of the locking pin 330. The connecting mechanism 160 may be a male/female connector that detachably locks the sliding element 150 in place in the cut-out of the smartphone. FIG. 13 depicts the locking pin 330 extending beyond an end of the sliding element 150. The portion that extends, when the sliding element is positioned in the cut-out of the primary smartphone 110, is received into the smartphone's recess 1205 to enable the sliding element to lay snug in the cut-out and not extend beyond an edge of the smartphone. A similar connection mechanism may be employed on the companion smartphone, although the recess may not be necessary since the locking pin is positioned on the primary smartphone's sliding element.

FIGS. 14-16 show an embodiment in which the sliding element 150 on the primary smartphone 110 rotates 180° to lock in place on the companion smartphone 105. Instead of sliding the sliding element from the primary smartphone to the companion smartphone 105 as depicted in FIGS. 1-2, the sliding element can alternatively or additionally rotate 180° about its axis and lock into place, as representatively shown by numerals 1505 and 1510. The locking pin underneath the sliding element can lock into the hinge pin and thereby create the hinge mechanism between the two smartphones. In this example, a different type of connection between the locking pin and hinge pin may be employed since the locking pin will be rotating instead of sliding, such as a tab and notch mechanism, snap or friction fit, etc.

Figure 17:
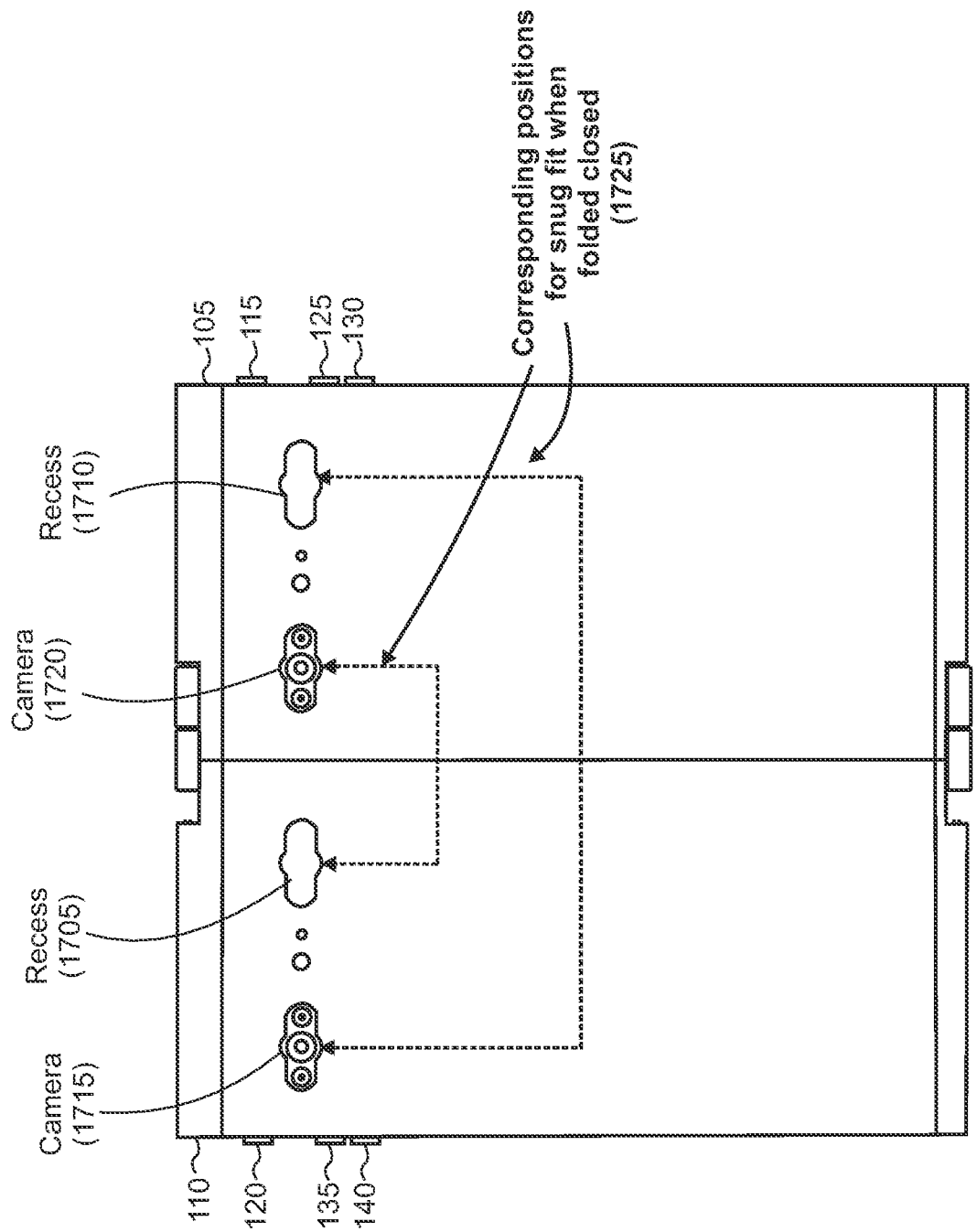
FIG. 17 shows an illustrative environment in which cameras and cut-outs on a rear of the smartphones are correspondingly positioned to enable a snug fit when the hinge closes a rear of both devices on top of one another.

FIG. 17 shows an illustrative diagram in which the outer hardware of the primary and companion smartphones 110, 105 have been constructed to enable seamless operation between the two hinged devices. For example, recesses 1710 and 1705 on each smartphone have been constructed to receive the cameras 1710, 1715 of the opposing smartphone when the hinge is completely closed, so that the rear of the two smartphones can lie snug against one another, as representatively shown by numeral 1725. The primary smartphone's camera 1715 fits into the recess 1710 of the companion smartphone, and the companion smartphone's camera 1720 fits into the recess 1705 of the primary smartphone.

Figure 18B:
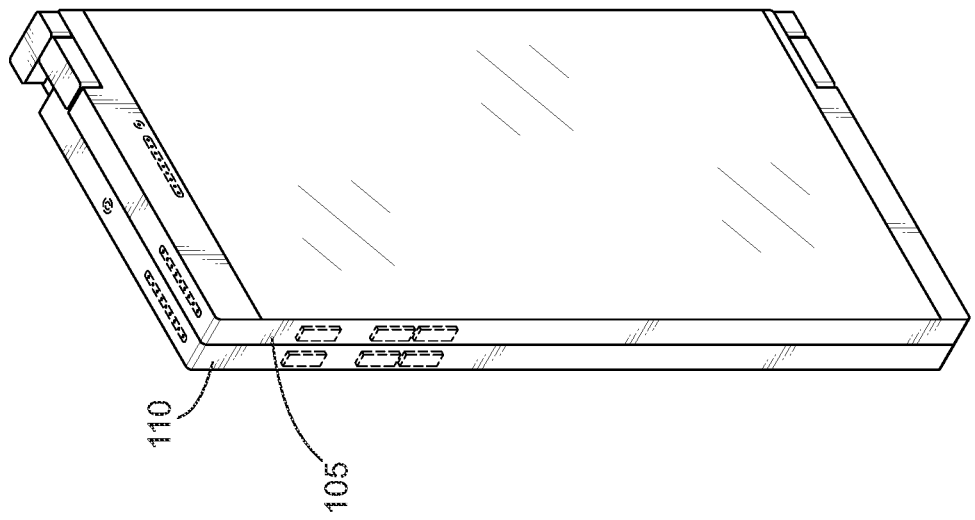
Figure 18A:
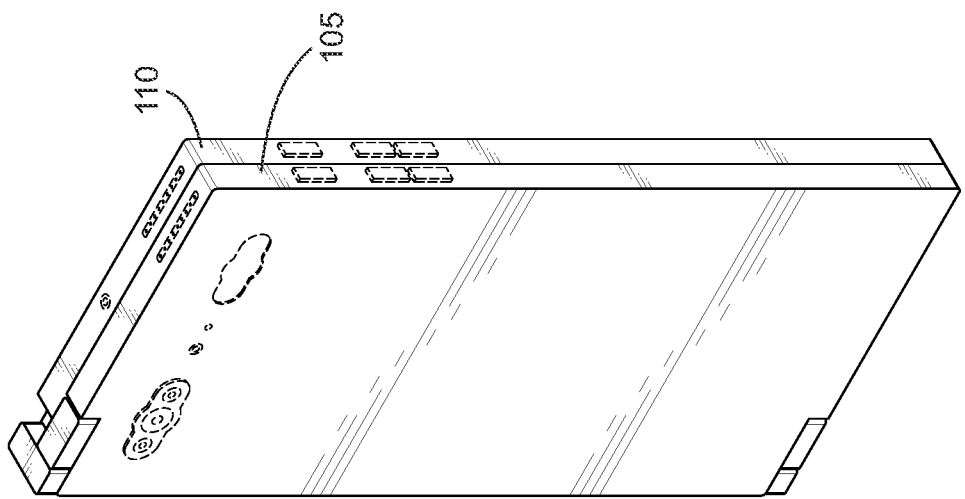
Figure 18D:
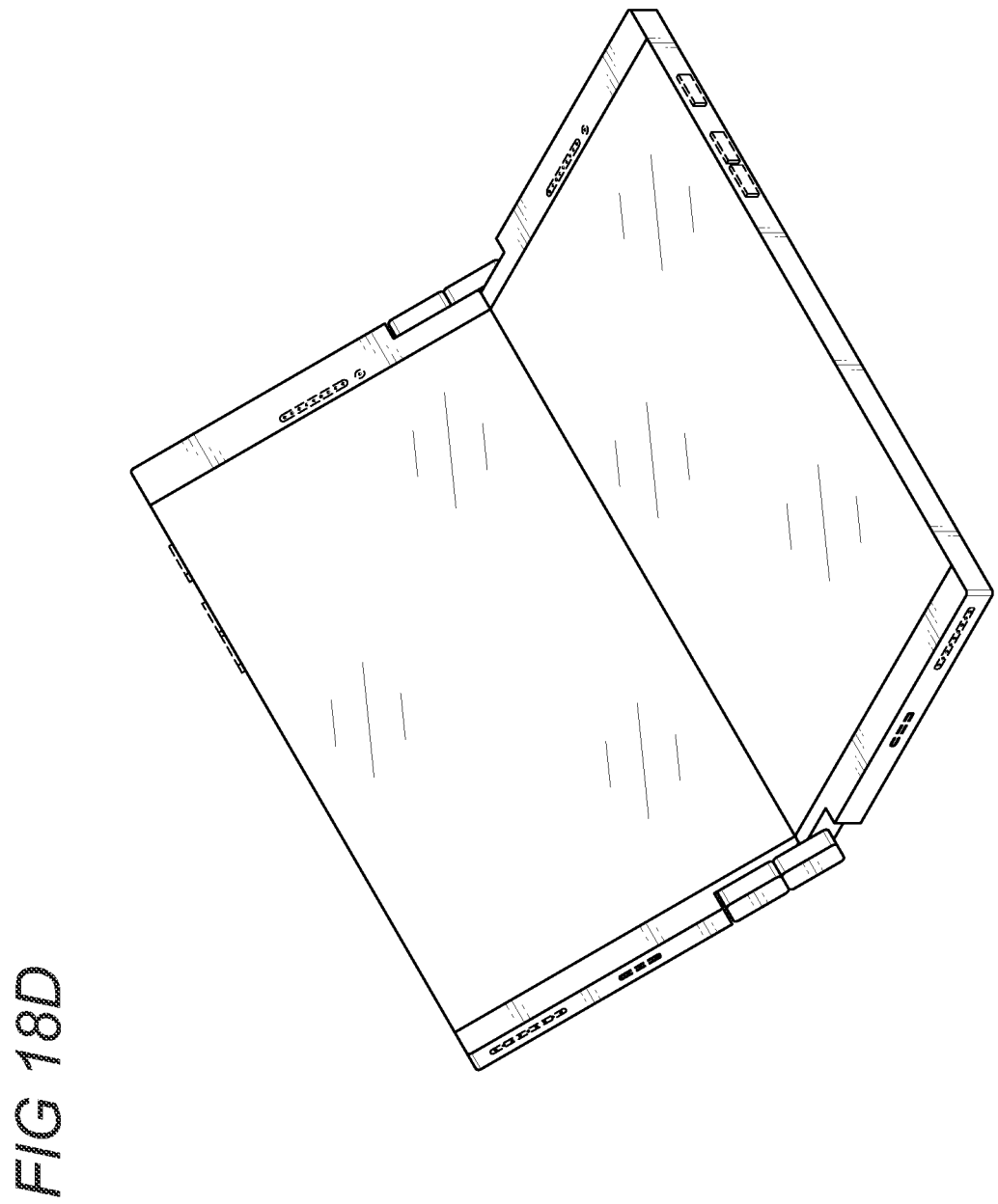
Figure 18F:
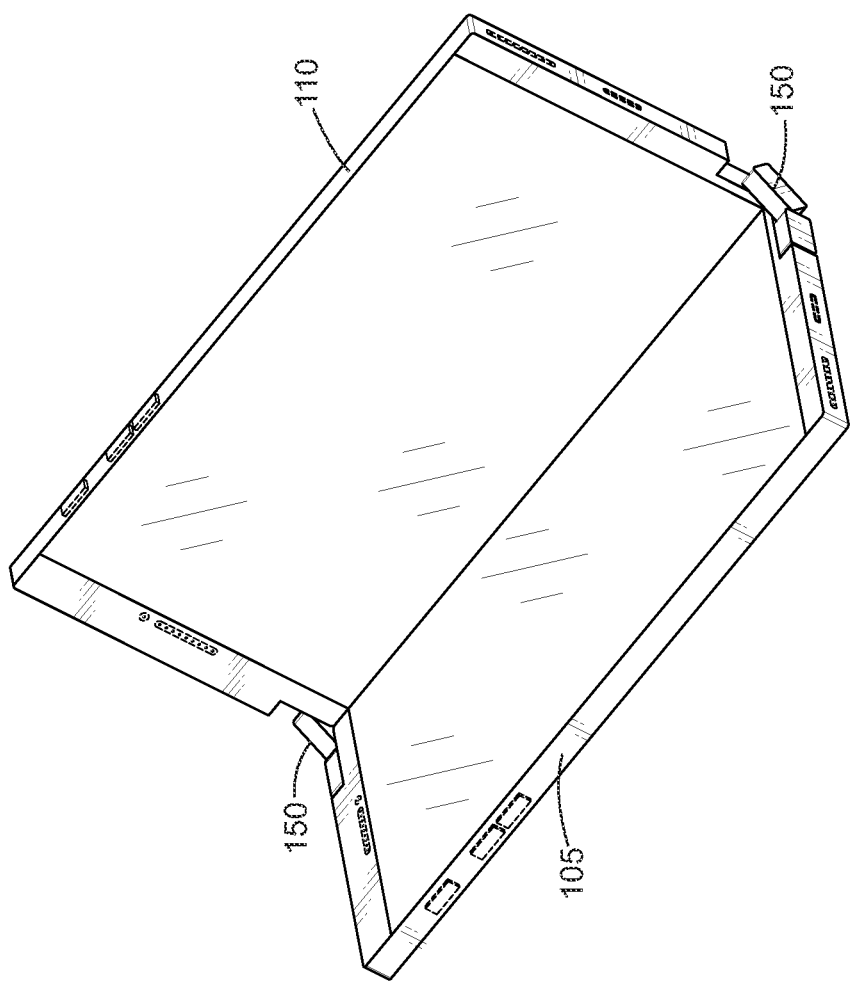

FIGS. 18A-E show various folding positions about the hinge mechanism in which the primary and companion smartphones 110, 105 can be placed. For example, FIG. 18A shows the hinge bent to put the smartphones screen-to-screen and FIG. 18B shows the hinge bent to put the smartphones rear-to-rear such that the cameras are snug fit inside the opposing smartphone's recess (FIG. 17). FIGS. 18C-E show various angles that the hinge mechanism can create between the two smartphones. FIG. 18E shows a 90° angle in which the rotatable shafts of the smartphones are manipulated to show the different types of angles that can be created by the dual hinge system.

When both smartphones are connected, a user may be prompted to enter a password to enable each device to communicate with the other. Thus, for example, while a user could manually connect two devices together using the hinge assembly discussed herein, doing so would not enable the devices to communicate (e.g., send signals, messages, share battery power, etc.) with each other without the user unlocking each phone with a password, PIN, biometric scan, and the like. The authorization prompt may show up on one or both devices. Once authorized, the devices may begin sharing battery power (e.g., one device can charge the other), sharing screen real-estate to enable a user to look at one full screen instead of two split screens, among other functions. Such functionality can be triggered upon connecting the two phones together and/or upon the user entering the proper authorization credentials.

Figure 19:
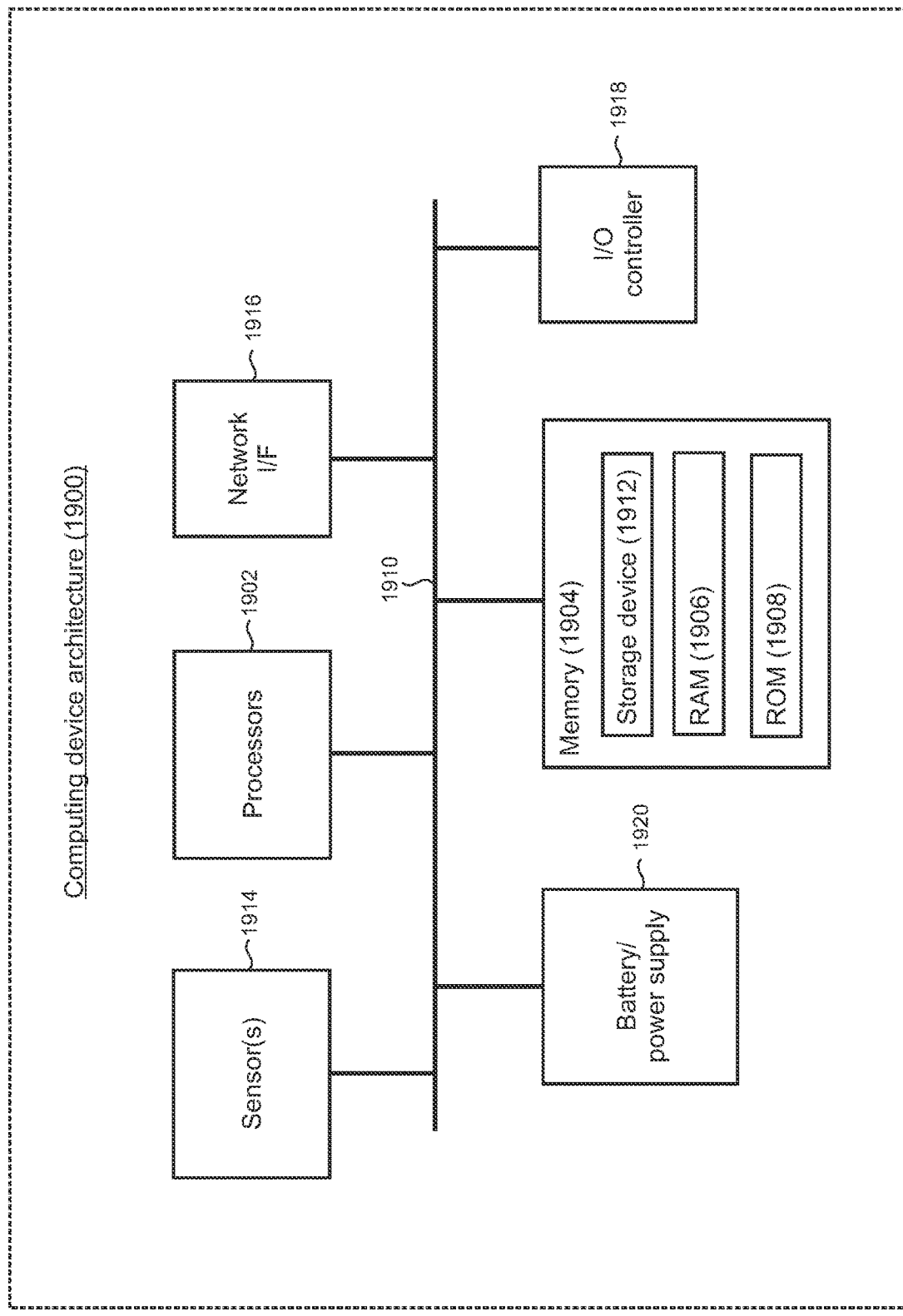
FIG. 19 is a simplified block diagram of an illustrative computer system that may be used in part to implement the present hinge mechanism for electronic devices.

FIG. 19 shows an illustrative architecture 1900 for a device, such as a smartphone or tablet, capable of executing the various components described herein for hinge mechanism for electronic devices. The architecture 1900 illustrated in FIG. 19 includes one or more processors 1902 (e.g., central processing unit, dedicated AI chip, graphics processing unit, etc.), a system memory 1904, including RAM (random access memory) 1906, ROM (read only memory) 1908, and long-term storage devices 1912. The system bus 1910 operatively and functionally couples the components in the architecture 1900. A basic input/output system containing the basic routines that help to transfer information between elements within the architecture 1900, such as during startup, is typically stored in the ROM 1908. The architecture 1900 further includes a long-term storage device 1912 for storing software code or other computer-executed code that is utilized to implement applications, the file system, and the operating system. The storage device 1912 is connected to the processor 1902 through a storage controller (not shown) connected to the bus 1910. The storage device 1912 and its associated computer-readable storage media provide non-volatile storage for the architecture 1900. Although the description of computer-readable storage media contained herein refers to a long-term storage device, such as a hard disk or CD-ROM drive, it may be appreciated by those skilled in the art that computer-readable storage media can be any available storage media that can be accessed by the architecture 1900, including solid stage drives and flash memory.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 1900.

According to various embodiments, the architecture 1900 may operate in a networked environment using logical connections to remote computers through a network. The architecture 1900 may connect to the network through a network interface unit 1916 connected to the bus 1910. It may be appreciated that the network interface unit 1916 also may be utilized to connect to other types of networks and remote computer systems. The architecture 1900 also may include an input/output controller 1918 for receiving and processing input from a number of other devices, including a keyboard, mouse, touchpad, touchscreen, control devices such as buttons and switches or electronic stylus (not shown in FIG. 19). Similarly, the input/output controller 1918 may provide output to a display screen, user interface, a printer, or other type of output device (also not shown in FIG. 19).

It may be appreciated that any software components described herein may, when loaded into the processor 1902 and executed, transform the processor 1902 and the overall architecture 1900 from a general-purpose computing system into a special-purpose computing system customized to facilitate the functionality presented herein. The processor 1902 may be constructed from any number of transistors or other discrete circuit elements, which may individually or collectively assume any number of states. More specifically, the processor 1902 may operate as a finite-state machine, in response to executable instructions contained within the software modules disclosed herein. These computer-executable instructions may transform the processor 1902 by specifying how the processor 1902 transitions between states, thereby transforming the transistors or other discrete hardware elements constituting the processor 1902.

Encoding the software modules presented herein also may transform the physical structure of the computer-readable storage media presented herein. The specific transformation of physical structure may depend on various factors in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 1900 in order to store and execute the software components presented herein. It also may be appreciated that the architecture 1900 may include other types of computing devices, including wearable devices, handheld computers, embedded computer systems, smartphones, PDAs, and other types of computing devices known to those skilled in the art. It is also contemplated that the architecture 1900 may not include all of the components shown in FIG. 19, may include other components that are not explicitly shown in FIG. 19, or may utilize an architecture completely different from that shown in FIG. 19.

Figure 20:
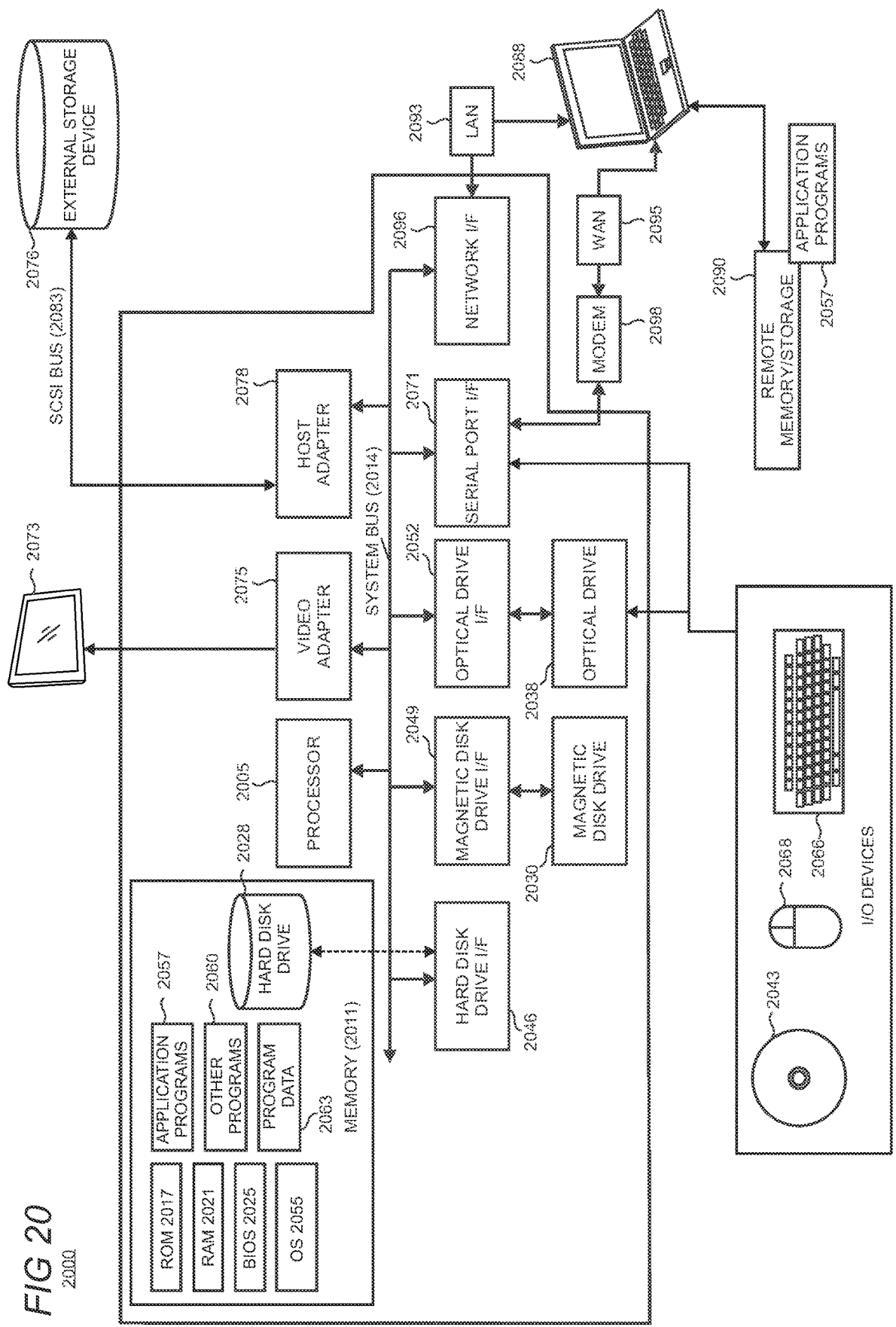
FIG. 20 is a simplified block diagram of an illustrative computing system that may be used in part to implement the present hinge mechanism for electronic devices.

FIG. 20 is a simplified block diagram of an illustrative computer system 2000 such as a smartphone, tablet computer, laptop computer, or personal computer (PC) which the present hinge mechanism for electronic devices may be implemented. Computer system 2000 includes a processor 2005, a system memory 2011, and a system bus 2014 that couples various system components including the system memory 2011 to the processor 2005. The system bus 2014 may be any of several types of bus structures including a memory bus or memory controller, a peripheral bus, or a local bus using any of a variety of bus architectures. The system memory 2011 includes read only memory (ROM) 2017 and random access memory (RAM) 2021. A basic input/output system (BIOS) 2025, containing the basic routines that help to transfer information between elements within the computer system 2000, such as during startup, is stored in ROM 2017. The computer system 2000 may further include a hard disk drive 2028 for reading from and writing to an internally disposed hard disk, a magnetic disk drive 2030 for reading from or writing to a removable magnetic disk (e.g., a floppy disk), and an optical disk drive 2038 for reading from or writing to a removable optical disk 2043 such as a CD (compact disc), DVD (digital versatile disc), or other optical media. The hard disk drive 2028, magnetic disk drive 2030, and optical disk drive 2038 are connected to the system bus 2014 by a hard disk drive interface 2046, a magnetic disk drive interface 2049, and an optical drive interface 2052, respectively. The drives and their associated computer-readable storage media provide non-volatile storage of computer-readable instructions, data structures, program modules, and other data for the computer system 2000. Although this illustrative example includes a hard disk, a removable magnetic disk 2033, and a removable optical disk 2043, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present hinge mechanism for electronic devices. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are intended to cover non-transitory embodiments, and does not include waves, signals, and/or other transitory and/or intangible communication media.

A number of program modules may be stored on the hard disk, magnetic disk, optical disk 2043, ROM 2017, or RAM 2021, including an operating system 2055, one or more application programs 2057, other program modules 2060, and program data 2063. A user may enter commands and information into the computer system 2000 through input devices such as a keyboard 2066, pointing device (e.g., mouse) 2068, or touch-screen display 2073. Other input devices may include a microphone, joystick, game pad, satellite dish, scanner, trackball, touchpad, touch-sensitive device, voice-command module or device, user motion or user gesture capture device, or the like. These and other input devices are often connected to the processor 2005 through a serial port interface 2071 that is coupled to the system bus 2014, but may be connected by other interfaces, such as a parallel port, game port, or universal serial bus (USB). A monitor 2073 or other type of display device is also connected to the system bus 2014 via an interface, such as a video adapter 2075. In addition to the monitor 2073, personal computers typically include other peripheral output devices (not shown), such as speakers and printers. The illustrative example shown in FIG. 20 also includes a host adapter 2078, a Small Computer System Interface (SCSI) bus 2083, and an external storage device 2076 connected to the SCSI bus 2083.

The computer system 2000 is operable in a networked environment using logical connections to one or more remote computers, such as a remote computer 2088. The remote computer 2088 may be selected as another personal computer, a server, a router, a network PC, a peer device, or other common network node, and typically includes many or all of the elements described above relative to the computer system 2000, although only a single representative remote memory/storage device 2090 is shown in FIG. 20. The logical connections depicted in FIG. 20 include a local area network (LAN) 2093 and a wide area network (WAN) 2095. Such networking environments are often deployed, for example, in offices, enterprise-wide computer networks, intranets, and the Internet.

When used in a LAN networking environment, the computer system 2000 is connected to the local area network 2093 through a network interface or adapter 2096. When used in a WAN networking environment, the computer system 2000 typically includes a broadband modem 2098, network gateway, or other means for establishing communications over the wide area network 2095, such as the Internet. The broadband modem 2098, which may be internal or external, is connected to the system bus 2014 via a serial port interface 2071. In a networked environment, program modules related to the computer system 2000, or portions thereof, may be stored in the remote memory storage device 2090. It is noted that the network connections shown in FIG. 20 are illustrative and other means of establishing a communications link between the computers may be used depending on the specific requirements of an application of the present hinge mechanism for electronic devices.

Various exemplary embodiments of the present immutable blob storage for cloud service providers are now presented by way of illustration and not as an exhaustive list of all embodiments. An example includes a hinge mechanism for a primary computing device, comprising: a rotatable shaft positioned inside the primary computing device and which extends from at least an upper portion to a lower portion of the primary computing device; and a hinge pin positioned inside a cavity of the rotatable shaft and about which the rotatable shaft rotates, wherein the rotatable shaft snaps into one or more positions against the hinge pin responsive to rotational movement.

In another example, the rotatable shaft extends vertically inside the primary computing device. As another example, clockwise or counterclockwise rotation of the rotatable shaft facilitates corresponding movement of the primary computing device. As another example, the rotatable shaft is cylindrical in shape. As another example, the rotatable shaft includes spring-loaded tabs to secure the cylinder against notches on the hinge pin. In another example, the positioning of the tabs on the rotatable shaft correspond to positioning of the notches on the hinge pin. In another example, the tabs and notches are evenly distributed about the rotatable shaft and hinge pin, respectively. As another example, a locking pin extends perpendicularly to and intersects with the hinge pin to prevent movement of the hinge pin. In another example, the hinge pin has a hole through which the locking pin extends. In another example, the sliding element includes a locking mechanism which secures the sliding element to the hinge pin. As a further example, a companion computing device to which the primary computing device is connected, wherein the hinge mechanism enables the primary computing device to rotate relative to the companion computing device when connected. In another example, wherein the companion computing device also includes a hinge mechanism, rotatable shaft, and hinge pin, and wherein the companion computing device's rotatable shaft enables the companion computing device to rotate relative to the primary computing device. In another example, the respective hinge mechanisms for the primary and companion computing devices enable dual rotation of each computing devices relative to each other. As another example, the locking pin extends through hinge pins on the primary and companion computing devices to connect the computing devices together and prevent rotational movement of each hinge pin when respective rotatable shafts are rotating. In another example, the rotatable shaft rotates clockwise and counterclockwise. As another example, the primary computing device is any one of a tablet device, smartphone, or laptop.

Another embodiment includes a primary computing device configured with a hinge mechanism to rotate relative to a companion computing device, comprising: a housing having a vertically oriented cavity; a display screen attached to the housing and configured to display graphical elements to a user; one or more processors positioned internal to the housing; memory storing instructions executable by the one or more processors; a rotatable shaft positioned inside the cavity of the housing and fixedly secured to the housing such that manipulation of the primary computing device translates to the rotatable shaft about the cavity.

As another example, the primary computing device of claim 16, wherein a hinge pin is positioned inside the cavity and is surrounded by the rotatable shaft. In another example, the rotatable shaft and hinge pin have corresponding tab and notch mechanisms that enable the rotatable shaft to releasably secure in place. As another example, the corresponding tabs and notches are evenly spaced 360° about the rotatable shaft and hinge pin.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A hinge mechanism for a primary computing device, comprising:
   a rotatable shaft positioned inside the primary computing device and which extends from at least an upper portion to a lower portion of the primary computing device; and
   a hinge pin positioned inside a cavity of the rotatable shaft and about which the rotatable shaft rotates, the hinge pin having positional points that engage with portions of the rotatable shaft,
   wherein the rotatable shaft, by engaging with the positional points, snaps into one or more positions against the hinge pin responsive to rotational movement.

2. The hinge mechanism of claim 1, wherein clockwise or counterclockwise rotation of the rotatable shaft facilitates corresponding movement of the primary computing device.

3. The hinge mechanism of claim 1, wherein the rotatable shaft extends vertically inside the primary computing device.

4. The hinge mechanism of claim 3, wherein the rotatable shaft is completely cylindrical.

5. The hinge mechanism of claim 3, wherein the positional points on the hinge pin are notches.

6. The hinge mechanism of claim 5, wherein the rotatable shaft includes spring-loaded tabs to secure the cylindrical rotatable shaft against the notches on the hinge pin.

7. The hinge mechanism of claim 6, wherein positioning of the tabs on the rotatable shaft correspond to positioning of the notches on the hinge pin.

8. The hinge mechanism of claim 7, wherein the tabs and notches are evenly distributed about the rotatable shaft and hinge pin, respectively.

9. The hinge mechanism of claim 1, further comprising:
   a companion computing device to which the primary computing device is connected, wherein the hinge mechanism enables the primary computing device to rotate relative to the companion computing device when connected.

10. The hinge mechanism of claim 9, wherein the companion computing device also includes a hinge mechanism, rotatable shaft, and hinge pin, and wherein the companion computing device's rotatable shaft enables the companion computing device to rotate relative to the primary computing device.

11. The hinge mechanism of claim 10, wherein the respective hinge mechanisms for the primary and companion computing devices enable dual rotation of the computing devices relative to each other.

12. The hinge mechanism of claim 1, wherein the primary computing device is any one of a tablet device, smartphone, or laptop.

13. A primary computing device configured with a hinge mechanism to rotate relative to a companion computing device, comprising:
 a housing having a vertically oriented cavity;
 a display screen attached to the housing and configured to display graphical elements to a user;
 one or more processors positioned inside the housing;
 memory storing instructions executable by the one or more processors; and
 a rotatable shaft positioned inside the cavity of the housing and fixedly secured to the housing, wherein when an edge of the primary computing device is positioned directly adjacent to an opposing edge of the companion computing device, manipulation of the primary computing device translates to the rotatable shaft about the cavity.

14. The primary computing device of claim 13, wherein a hinge pin is positioned inside the cavity and is surrounded by the rotatable shaft.

15. The primary computing device of claim 14, wherein the rotatable shaft and hinge pin have corresponding tab and notch mechanisms that enable the rotatable shaft to releasably secure in place.

16. The primary computing device of claim 15, wherein the corresponding tabs and notches are evenly spaced 360° about the rotatable shaft and hinge pin.

17. The primary computing device of claim 13, further comprising a movable sliding element that simultaneously overlaps with and connects the primary and secondary computing devices together.

18. The primary computing device of claim 17, wherein the primary and companion computing devices include a cut-out to accommodate the sliding element.

19. The primary computing device of claim 13, further comprising a recess on a rear side of the housing of the primary computing device, in which the recess is proportioned to accommodate a protruding component on the secondary computing device when the primary and companion computing devices are connected.

20. The primary computing device of claim 19, wherein the protruding component on the companion computing device is a camera lens.

* * * * *